May 28, 1974  L. J. DROEGE ET AL  3,813,310

METHOD FOR THE MANUFACTURE OF FLAT COSTUME JEWELRY

Filed Oct. 2, 1972  3 Sheets-Sheet 2

May 28, 1974   L. J. DROEGE ET AL   3,813,310

METHOD FOR THE MANUFACTURE OF FLAT COSTUME JEWELRY

Filed Oct. 2, 1972

United States Patent Office 3,813,310
Patented May 28, 1974

3,813,310
METHOD FOR THE MANUFACTURE OF FLAT COSTUME JEWELRY
Lee John Droege, Michael J. Reardon, and Alan Roy Wilhite, Central City, Colo., assignors to Central City Micro Foundry Ltd., Central City, Colo.
Filed Oct. 2, 1972, Ser. No. 294,360
Int. Cl. C23f 1/02
U.S. Cl. 156—3
8 Claims

ABSTRACT OF THE DISCLOSURE

This invention concerns costume jewelry manufactured through photofabrication processes from flat production sheets to form items such as earrings and small pendants. The appearance of these items is enhanced by small, transparent or translucent, colored inserts of selected plastic materials. After conventional photofabrication operations form the earrings and pendants in a production sheet, including openings to hold the inserts, further operations include the use of a backing sheet, preferably aluminum foil, adhered against the production sheet and items thereon to hold liquid plastic in the openings until it sets to form the inserts. A further refinement in the production of the items includes the provision of small aluminum reflector tabs at the back of the inserts which materially enhance the brilliance and appearance of the items. The tabs are preferably formed by using an aluminum backing sheet to hold the plastic until it sets, and thereafter, by chemically milling away all of the backing sheet except portions at the inserts.

---

This invention relates to costume jewelry, and more particularly to the manufacture of small items of costume jewelry, such as earrings and pendants, from flat metal sheets, and through processes invloving the chemical milling of a flat, metal sheet to obtain various intricate designs of costume jewelry. Such jewelry is hereinafter referred to as "flat costume jewelry."

A primary object of the present invention is to provide a novel and improved construction of flat jewelry, such as an earring or pendant, which may be of a simple or intricate design and having openings wherein transparent and clear or colored inserts of resinous materials may be placed to simulate the gemmy inserts mounted in more expensive jewelry items.

Another object of the invention is to provide a novel and improved method for the manufacture of flat costume jewelry, such as earrings and pendants, wherein simple and easy steps are performed to place transparent and colored resinous inserts within openings in the jewelry to simulate gems therein and to improve the appearance and the quality of the flat jewelry items.

Another object of the invention is to provide in a method for the manufacture of small items of flat, costume jewelry from flat metal production sheets, a novel and simplified sequence of steps for preparing the production sheets for the application of inserts of transparent and translucent colored resins in openings in the flat items.

Another object of the invention is to provide, in items of flat costume jewelry having transparent, clear or colored resinous inserts, a novel and improved arrangement of a reflective surface associated with the inserts to enhance, to a surprising degree, the brilliance of the inserts and further, novel and simplified sequences of steps for applying reflective surfaces to the inserts.

Yet other objects of the invention are to provide a novel and improved method for the manufacture of small items of flat costume jewelry having inserts of synthetic resin in openings in the item to simulate gems, which produces a neat appearing, high quality, low cost product through simple, easily-controlled, reliable and reproduceable manufacturing steps.

With the foregoing and other objects in view, our present invention comprises certain construction, combinations and arrangements of materials, and sequences, operations and steps, all as hereinafter described in detail, defined in the appended claims and illustrated in the accompanying drawings in which:

The manufacture of low cost, costume jewelry involves a large industry wherein each manufacturer strives to produce high quality, low cost items in an effort to better compete with foreign imports. In the past decade, a procedure for manufacturing costume jewelry from flat sheets by chemical milling processes has been introduced to make flat costume jewelry items. This procedure involves photo-fabrication steps wherein a metal sheet with a photosensitive material is photographed and developed to leave a protective surface upon portions of the sheet, including the costume jewelry items. At other portions of the sheet, as about the costume jewelry items, the metal surfaces are exposed. The exposed surfaces are subsequently milled, or eroded away, by chemical action. With this process, intricate patterns of flat costume jewelry can be quickly and easily manufactured at low unit cost.

The present invention concerns refinements and improvements in the basic steps of manufacturing flat costume jewelry by chemical milling and the further steps of the addition of resinous inserts in the openings or windows of the flat jewelry, the inserts being transparent and colored to produce an appearance simulating gems, stained glass and the like. Thus, the invention comprises, in essence, a combination of steps and procedures for the manufacture of flat costume jewelry supplemented by steps and operations for the application of such resin inserts in the openings of the jewelry, and in a manner which helps the artists applying the resins to do high quality work. As a further refinement to provide an improved article of costume jewelry, the inserts include reflectors of metal foil to produce reflective effects of surprising brilliance when the costume jewelry is worn, for example as in earrings.

Figure 1:
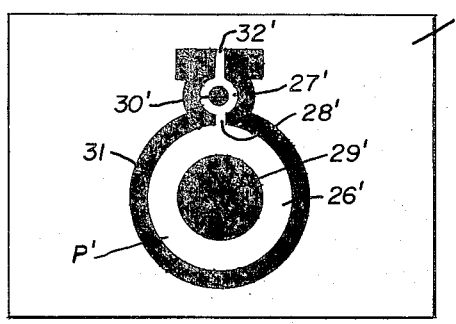
FIG. 1 illustrates the drawing of an original layout of a simple pendant, such as may be used for an earring, which is to be manufactured and produced according to the improved process.
Figure 5:
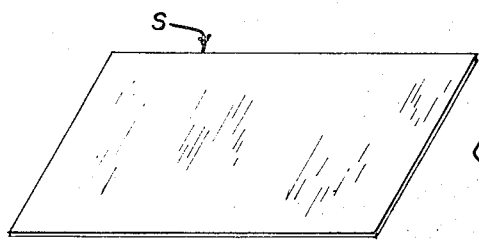
FIG. 5 represents a metal production sheet used in the improved process, which has a protective photosensitive coating.
Figure 15:
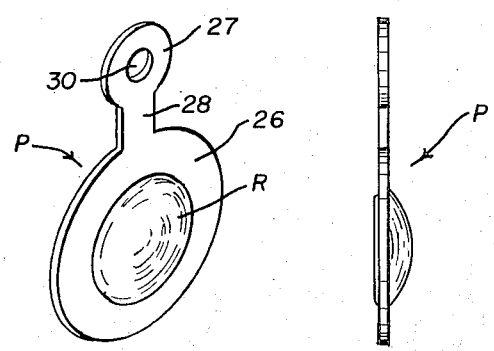
FIG. 15 is an enlarged isometric view of the finished pendant.

The present invention is best described and understood with reference to the basic process of manufacturing flat costume jewelry by chemically milling flat, rectangular production sheets of metal. A typical production sheet S, preferably of brass, is shown at FIG. 5 of the drawings and is hereinafter further described. The drawings set forth certain steps in the manufacture of a simple pendant P such as shown at FIG. 15, to illustrate the process for the manufacture of flat costume jewelry and improvements thereto. FIG. 1 represents the first step of the process, a large-scale drawing of the outline P' of the pendant P. The pendant outline P', illustrated in FIG. 1, depicts a ring 26' and a small connector eye 27' is connected to the ring by a short neck 28'. The connector eye on the finished pendant will permit the pendant to be hung from a chain or from an ear lobe hook or other connector member, not shown. The opening 29 in the ring forming the finished pendant will be filled with a colored plastic insert as hereinafter described. The opening 30 of the eye will receive the connector member above mentioned.

To prepare this drawing for the chemical milling process, a blackened strip 31 outlines the drawing of the ring 26', eye 27' and neck 28' of the pendant P. The eye opening 29' of the ring opening 30' are also blackened. The blackened strip 31 and openings 29' and 30' represent those portions of the metal production sheet S which are to be removed by the milling operation to form the pendant, as hereinafter explained. To complete the design, a short connector strip 32' extends above the eye 27' to connect the pendant with the production sheet S after the milling operation so the connector may remain on the production sheet for further operations.

Figure 2:
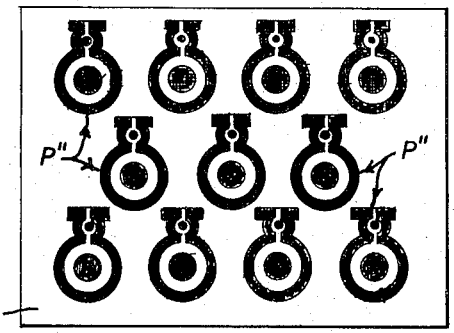
FIG. 2 illustrates a layout sheet whereon a plurality of reduced-scale reproductions of the pendant of FIG. 1 are arranged, preliminary to the make-up of a master for production of the pendants.

Next, this original drawing of the pendant P' is photographed and a number of similar prints P" are pasted onto a layout sheet 33 in any suitable arrangement which will effectively load a production sheet with pendants. Thus, while eleven pendants are shown in the layout at FIG. 2 and on the subsequent figures of the drawing, it is to be understood that the numbers may be considerably more than this for efficient production operations. The photographic steps to obtain the prints P" for the layout sheet 33 are not shown nor described since they are conventional.

Figure 3:
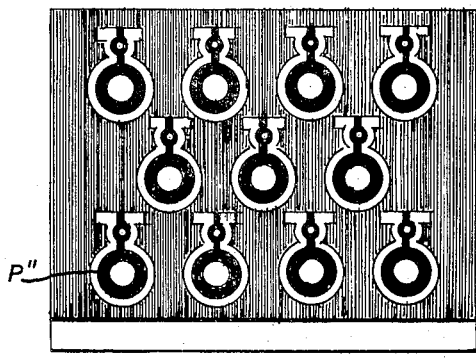
FIG. 3 illustrates a photographic transparency obtained from the layout sheet of FIG. 2, which is to be used in the preparation of a master transparency.
Figure 4:
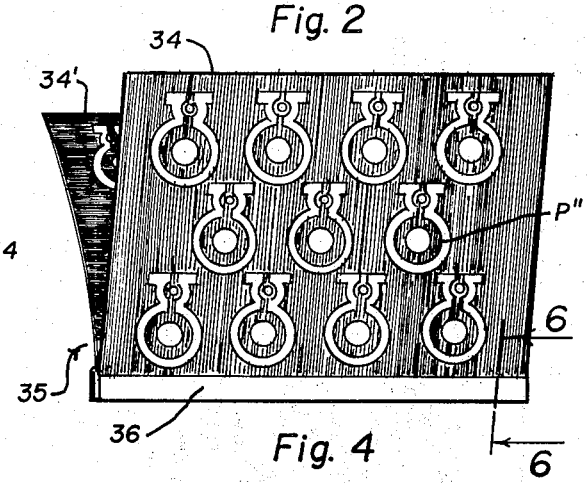
FIG. 4 illustrates the completed master transparency which uses a pair of photographic transparencies such as shown at FIG. 3.
Figure 6:
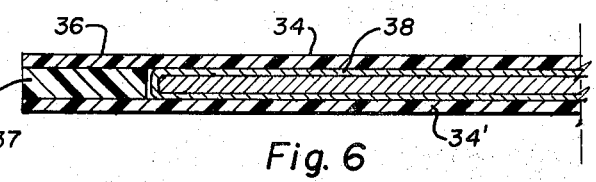
FIG. 6 is a fragmentary sectional detail, as taken from the indicated line 6—6 at FIG. 4, but on an enlarged scale, of edge portions of the master transparency and an edge portion of the production sheet of FIG. 5 sandwiched between the layers of the master transparency for photographic exposure of the same.

The layout sheet 33 is preferably proportioned to correspond with the production sheet S and when the layout sheet 33 is completed, it is photographed. The resulting photo-negative 34, shown at FIG. 3, is proportioned to overlie the production sheet S and becomes part of a reproduction master 35, shown at FIG. 4. The master 35, which may be called a negative reproduction master, is formed of two identical photo-negatives 34 and 34' which are carefully matched so that each pendant image P", on each negative, is in perfect registration with the corresponding pendant image of the other negative. These two negatives 34 and 34' are then bound together along one edge 36 with a spacer strip 37 between them at this edge 36 as best shown at FIG. 6. The thickness of the spacer strip 37 is substantially the same as the thickness of the metal production sheet S. Also, the area of the master 35, not counting the portion holding the spacer strip 37, is preferably, precisely the same size as the production sheet S.

The production sheet S, shown at FIG. 5, is a rectangular brass sheet and is approximately 0.025-inch thick, although such a specified thickness is not at all critical. The sheet is preferably of brass, but it may be of other materials which can be milled with a chemical solution. Ferric chloride, the most common solution used for this purpose, can be used to mill sheets of brass, German silver, stainless steel, copper, aluminum and bronze.

This production sheet S is first prepared by coating it with a photosensitive protective layer 38 of a material known as a positive acting photo-resist, available commercially as such from several sources, one type being known as Shipley AZ–111 produced by the Shipley Company of California. This protective layer 38 is sensitive to light. Once portions of these layers 38 are exposed to light, the sheet may then be treated with a developer to remove the exposed portions of the layers. Thereafter, the sheet may be chemically milled to etch away the exposed portions where the layer 38 has been removed. Where a positive reproduction master is used, which is opposite to the negative reproduction master above described, the portions of the layer to be removed are not exposed to light. A negative photo-resist layer is then necessary for the production sheet. A negative resist, known as Kodak Type 3 of the Eastman Kodak Company is useful for this purpose.

With either type of reproduction sheet and the proper type of photo-resist layer for the sheet, the procedure is to carefully place the production sheet S between the two sheets 34 and 34' of the reproduction master 35 and to expose both sides of this sandwich of sheets to light. The manner in which the production sheet S is placed between the negatives is indicated at FIG. 6, with an edge of the production sheet abutting against the spacer strip 37 to assure proper positioning of the production sheet at all times and to permit the chemical milling operations to proceed as will be hereinafter described.

Figure 7:
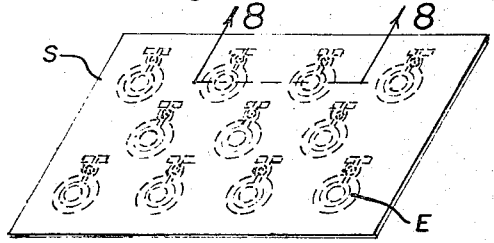
FIG. 7 represents the production sheet of FIG. 5 after being photographed and developed, and with the outlines of the pendants thereon being shown in dotted lines.
Figure 8:
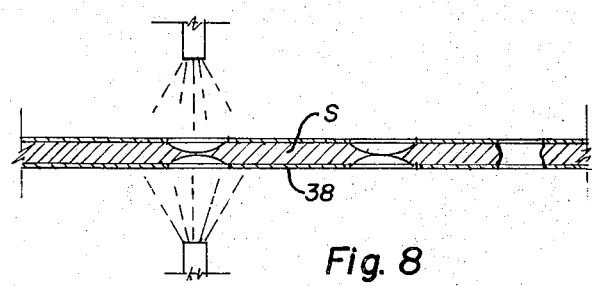
FIG. 8 is a fragmentary sectional portion, as taken from the indicated line 8—7 at FIG. 7 but on an enlarged scale, to indicate in a diagrammatic manner the chemical milling of the metal at openings in the protective coating as the production sheet passes through a chemical solution.

Once the production sheet is exposed, it is subjected to a conventional developing process which will remove the exposed portions E of the photosensitive layer 38 at those areas where etching is desired, as between the dotted line indications at FIG. 7. The sheet is then ready for chemical milling. The chemical milling, or etching, of a sheet of metal is performed with conventional apparatus which either permits the sheet S to be immersed in an etching solution, such as Ferric chloride, or to move past a spray of the solution striking both faces of the sheet S, as diagrammatically indicated at FIG. 8.

Figure 9:
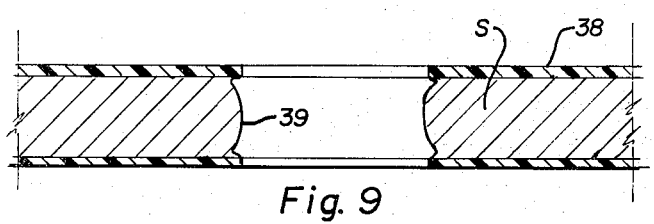
FIG. 9 is a fragmentary sectional detail similar to FIG. 8, but on a greatly enlarged scale to better show the manner in which an opening in the sheet is chemically milled.

Regardless of the procedure used, it is preferable to mill the production sheet S from both sides, simultaneously. Proper chemical milling will form rounded edges at each pendant so etched, as in the manner indicated by edges 39 at FIG. 9. Such rounded edges 39 not only provide for an improved, finished appearance of the edges of the flat costume jewelry obtained by the process, but also provide a desirable and necessary locking edge to facilitate holding inserts within the opening 29 in the finished pendant.

Figure 10:
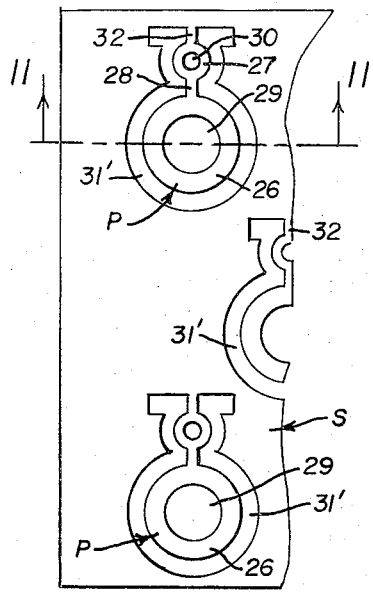
FIG. 10 shows a fragmentary portion of the production sheet after the pendants have been formed therein by the chemical milling operation and after the sheet is ready for painting or plating.

The process thus far described is essentially conventional and the final product obtained will consist of the etched metal production sheet S, such as shown at FIG. 10. This etched sheet has cutout or etched portions 31' about the pendants where strips 31 and other darkened areas were provided on the original drawing at FIG. 1. Each pendant P in the production sheet, is formed as a ring 26, an eye 27 and a neck 28 between the ring and eye. The opening 29 in the ring may receive an insert and the orifice 30 in the eye will receve a connector means, not shown. A connector strip 32 holds the pendant P to the production sheet S. As heretofore mentioned, the production sheet S may have a large number of flat costume jewelry items formed in its surface and carried by it. All of these jewelry items may thus be handled simultaneously during subsequent finishing operations, and will remain on the production sheet until they are finished. Thereafter, the pendants are removed from the production sheet by severing the strips 32.

The first of a sequence of steps to complete the flat jewelry items, such as the pendant P which is carried upon the production sheet, is to either paint or plate the sheet and the items upon it. Paint, which may include lacquers and acrylic enamels, may be applied directly as soon as the etching solution is washed off the production sheet. However, if the sheet is to be plated, the photosensitive layer 38 must be removed. This can be done with suitable chemicals, or with a positive photo-resist by simply re-exposing and re-developing the production sheet which washes away the photo-resist. The production sheet, a brass sheet, and the pendants or like items formed in it may be easily gold plated, silver plated or nickel plated to enhance the appearance of the flat pendants in the sheet S. The processes for either painting or plating the pendants P are conventional and need not be described further, it being understood that a coating 40 of paint or plating is applied to the entire etched sheet and all of the pendants formed in it.

After the pendant P is painted or plated, it may be coated wtih a layer of clear lacquer to protect and finish it especially if the sheet is nickel plated. If, however, is resinous insert R is desired in the opening 29 of the pendant, as shown at FIG. 15, it will be formed in the opening 29 by a simple sequence of steps as hereinafter set forth. Several types of synthetic resins may be used for the inserts R and these resins may be transparent, translucent or opaque. Also, they may be colored to simulate gems, stained glass or the like. Polyester type resins are preferred because they can be furnished as a liquid. The liquid will set up in a fairly short time by use of a small amount of catalyst and can produce tight fitting, hard and neat appearing inserts. Moreover, there exists a number of dyes for obtaining any desired color of insert.

Figure 11:
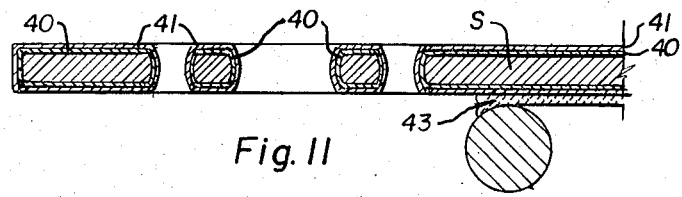
FIG. 11 is a sectional portion of the production sheet as taken from the indicated line 11—11 at FIG. 10, but on an enlarged and exaggerated scale, and indicating a coating of paint or plating, a coat or lacquer forming a protective release layer and a layer of adhesive applied to the underside of the sheet.
Figure 12:
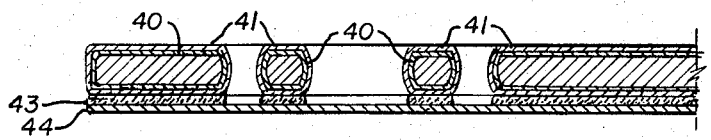
FIG. 12 is the sectional portion shown at FIG. 11, but illustrating a further step of preparation where a backing cover is applied to the underside of the sheet.

The preferred mode for the preparation of the production sheet S and its pendants, for applying the liquid resins to form the inserts R, is diagrammatically indicated at FIGS. 11 and 12. The preparation steps commence with spraying a protective release coat 41 of a clear lacquer onto the production sheet S and its pendants P. Next, an adhesive coating 43 is sprayed or rolled onto the underside of the production sheet and its pendants, as indicated at FIG. 11. Thereafter, as the final step and while the adhesive 43 is still tacky, a cover sheet 44 is tightly fitted against the underside of the production sheet and its pendants to be securely held in place by the adhesive coating 43.

The release and protective coating 41 is preferably a tough, glossy, high quality lacquer and will adhere to the adhesive layer 43 with only a moderate degree of tenacity, so that the cover sheet 44 may be removed from the production sheet after inserts have been formed in the pendants. It was found that a water soluble glue, such as fish glue, was preferred for the adhesive coating 43, because it would easily wash away from the finished pendants. A suitable lacquer for the release and protective coating 41 is a spray type resin having a hydrocarbon, resin base such as is marketed as Natcol Craft Spray manufactured by Natcol Crafts, Inc. of Redlands, Calif. The preferred material for the cover sheet 44 was found to be aluminum foil.

Figure 13:
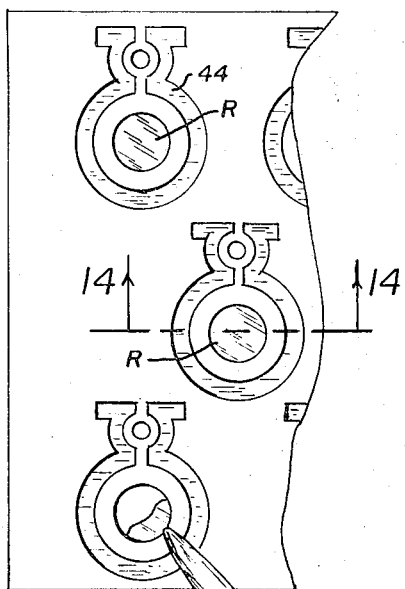
FIG. 13 shows a fragmentary portion of the production sheet, similar to FIG. 10, but after it is prepared with a backing cover and a protective lacquer layer, and indicating further, the manner in which a resin insert is implanted in a pendant.
Figure 16:
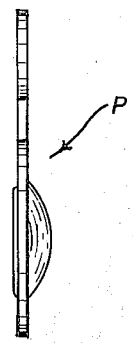
FIG. 16 is an edge view of the fiinished pendant.

The application of the resin inserts R is illustrated diagrammatically at FIG. 13. The resin may be prepared in a conventional manner by using selected amounts of dye and the necessary amounts of accelerators. Thereafter, it is applied to each of the openings 29 in the pendants on the production sheet. After the same has set, the aluminum foil may be removed by tearing it away from the production sheets and the production sheet and its pendants are then washed to remove all vestiges of the adhesive. Thereafter, another coat of clear lacquer may be sprayed upon the finished pendants and the final step will consist in removing the pendants from the production sheet by clipping the connection strips 32 away from the eyes 30 of the pendants to product a compact, neat-appearing unit as illustrated at FIGS. 15 and 16.

Figure 23:
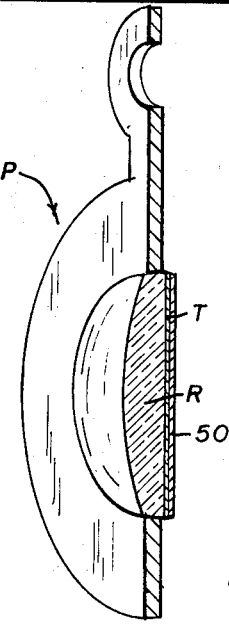
FIG. 23 is a sectional isometric view of a completed pendant showing an aluminum reflective surface as the base side of the pendant covers the resin insert.

The invention contemplates further, the use of reflectors at the back of the resin inserts R, for it was discovered that a good reflector would enhance the brilliance of the transparent inserts to a surprising degree. The best and a truly reflective surface was found to be aluminum foil and the reflector may consist of a small tab T of aluminum foil, such as shown at FIG. 23. The tab T is mounted upon the inserts R according to a simple sequence of steps as hereinafter set forth.

Figure 14:
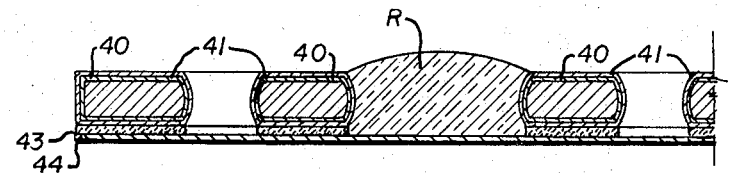
FIG. 14 is a sectional portion of the production sheet as taken from the indicated line 14—14 at FIG. 13, but on an enlarged and exaggerated scale to depict the manner in which the resin insert is fitted into the pendant.

Aluminum foil was found to be a preferable material as a cover sheet 44. One important advantage was that when the liquid plastic resin used to form the insert R would fill the opening 29, it would be held in place by the clean metal surface of the aluminum cover sheet 44, as best indicated at FIG. 14. When the cover sheet was pulled away from the production sheet S and pendant P, it would release from the inserts without trouble. This would suggest that the aluminum foil could not be used as a reflector tab T. However, it was discovered that a moderate degree of adhesion did exist between the aluminum cover sheet 44 and the plastic insert, and that a reflector tab formed out of the cover sheet 44 would not normally release from insert R.

The first steps in the preparation of the production sheet S to form the reflector tabs T are essentially the same as heretofore described. After the production sheet is painted or plated, the lacquer coat 41 is sprayed onto the sheet and an adhesive coating 43 of water soluble glue is applied to the underside of the production sheet and its pendants. The aluminum cover sheet 44 is then tightly fitted against the underside of the production sheet and its pendants, the same as heretofore described. Likewise, the resin inserts R are applied and permitted to set as in the manner previously described.

Figure 17:
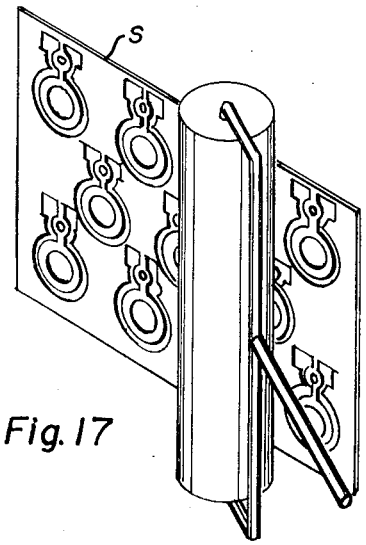
FIG. 17 is an isometric view representing a completed production sheet having a layer of adhesive applied thereto, similar to the showing at FIG. 11.
Figure 18:
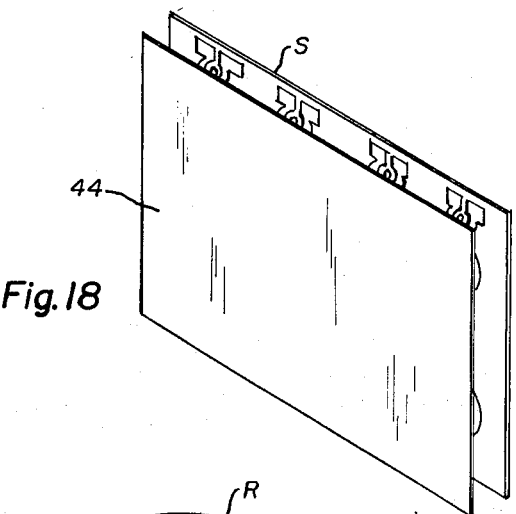
FIG. 18 is an isometric view representing the underside of the production sheet after receiving the adhesive coating, and about to be lapped with a sheet of aluminum foil.
Figure 19:
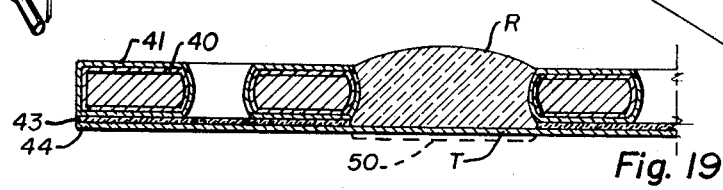
FIG. 19 is a sectional portion of the production sheet through a pendant similar to FIG. 14, but showing an aluminum foil backing and a protective covering on the foil in broken lines.
Figure 20:
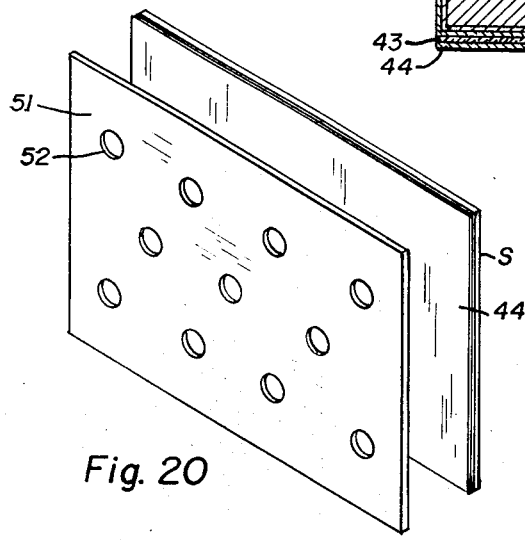
FIG. 20 is an isometric view of the underside of the sandwich of components formed as shown at FIG. 19 and about to be lapped by a stencil sheet.
Figure 21:
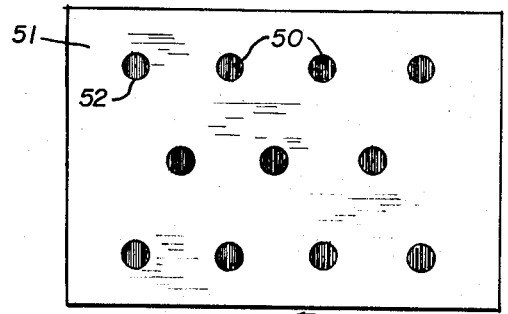
FIG. 21 is a base view of the sandwich of components showing portions of the aluminum foil as being spotted with protective covers at locations determined by the openings in the stencil sheet.
Figure 22:
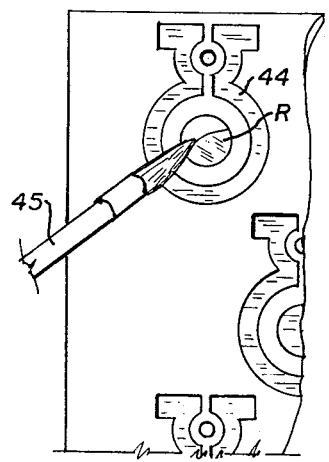
FIG. 22 shows a fragmentary portion of the production sheet similar to FIG. 13, but with the aluminum foil backing covering the openings in the pendants and showing resin inserts being applied to these openings.

To diagrammatically set forth these several steps, FIG. 17 illustrates the application of glue to the underside of the production sheet and its pendants and FIG. 18 illustrates the placing of the aluminum foil 44 against the adhesive surface on the production sheet. The sectional view at FIG. 19 shows an insert R in a pendant P, similar to FIG. 14, but indicating in broken lines a protective cover spot 50 on the aluminum foil opposite the insert which will define the reflector tab T.

The removal of the aluminum foil backing sheet 44, excepting those portions constituting the tabs T, is effected by a chemical milling operation the same as that used to etch out the pendants, heretofore described. A ferric chloride solution is an effective agent for this purpose and is capable of quickly eroding the thin aluminum foil. It is necessary to protect the portions of the aluminum foil 44, forming the tabs, from the ferric chloride solution, and cover spots 50, of a selected paint, are applied over the tabs T. Any paint or lacquer which will resist ferric chloride can be used for this purpose, and the paint may be colored the same as the color of the pendant so that the spots 50 will not be noticed on the finished product. Also, the paint may be a clear lacquer.

A cover spot 50 will be required at each pendant where a reflector is to be used, and the quickest and most effective mode of applying such spots is by use of a stencil sheet 51 which has holes 52 of a proper size and arranged to register with all of the insert openings 29 of the pendants on the production sheets. A simple mode of manufacturing such a stencil is to prepare a reproduction master substantially identical to the master 35 heretofore described, and modified only by eliminating the milling strip 31 outlining the pendant and with only the openings 29' being present. A photo-fabricated production sheet, exposed to this modified reproduction master, forms the stencil 51.

Accordingly, after the inserts R are formed in the openings 29 of the pendants P, the stencil 51 is placed against the aluminum backing 44 with the openings 52 in registration with the inserts R. The cover spots 50 may then be obtained by paint spraying through the stencil openings. Thereafter, the further steps in the preparation of the pendants P include milling away the cover sheet as described, washing the production sheet and pendants to remove the glue, applying a finish coat of lacquer and removing the pendant from the production sheet.

A number of variations are possible in the manufacture of these "flat costume jewelry" items. For example, various similar materials may be substituted for those herein disclosed. Also, it is apparent that other alternates and equivalents which are within the spirit and the scope of the invention, can be devised and constructed by those skilled in the art. Hence, we desire that our protection be limited, not by the constructions illustrated and described, but only by the proper scope of the appended claims.

We claim:
1. A process for the manufacture of an item of costume jewelry having a plastic insert in an opening through the item, from a flat metal production sheet, including the steps of:
 (a) covering the production sheet with a photoresist layer, exposing and developing thereon an outline about the said item and of the said opening therein where the photoresist layer is removed and chemically milling away the outline and opening to form the item in the production sheet;
 (b) adhering a backing sheet to a designated back side of the production sheet and said item;
 (c) filling the aforesaid opening from the other side of said item with a liquid, settable, synthetic plastic resin and permitting the same to set;
 (d) thereafter, removing the backing sheet; and
 (e) removing the item from the production sheet.

2. In the process defined in claim 1, including the further step of:
 applying a reflector to the designated back side of the item over the insert.

3. In the process defined in claim 1, including the further step of:
 applying a water-soluble adhesive to the designated back side of the production sheet and item therein, and wherein the step of removing the backing sheet includes soaking the same in water to dissolve the adhesive.

4. In the process defined in claim 1, wherein:
 said backing sheet is aluminum foil.

5. In the process defined in claim 4, wherein:
 the aluminum foil backing sheet is removed by chemically milling the same from the production sheet.

6. In the process defined in claim 5, including the further step of:
 applying a protective coating to the aluminum foil backing sheet at the aforesaid opening which is adapted to resist the chemical milling action and to form an aluminum reflector at the insert.

7. In the process defined in claim 1, including the further step of:
 applying an adhesive to the designated back side of the production sheet and item therein, to receive and hold said backing sheet.

8. In the process defined in claim 7, including the further step of:
 applying a release layer between the backing sheet and the production sheet and item therein, whereby to permit the backing sheet to be pulled away from the production sheet and item therein after the insert is applied.

References Cited
UNITED STATES PATENTS

| | | | |
|---|---|---|---|
| 1,072,047 | 9/1913 | Shepard | 156—7 |
| 2,010,336 | 8/1935 | Strassner et al. | 156—8 |
| 2,036,021 | 3/1936 | Cheney | 156—3 |

WILLIAM A. POWELL, Primary Examiner

U.S. Cl. X.R.

63—32; 156—8, 247, 289, 293; 161—4, 5, 32